US008468526B2

(12) United States Patent
Saha et al.

(10) Patent No.: US 8,468,526 B2
(45) Date of Patent: Jun. 18, 2013

(54) CONCURRENT THREAD EXECUTION USING USER-LEVEL ASYNCHRONOUS SIGNALING

(75) Inventors: Bratin Saha, San Jose, CA (US);
Ali-Reza Adl-Tabatabai, Santa Clara, CA (US); Quinn A. Jacobson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1797 days.

(21) Appl. No.: 11/480,090

(22) Filed: Jun. 30, 2006

(65) Prior Publication Data
US 2008/0005737 A1    Jan. 3, 2008

(51) Int. Cl.
*G06F 9/46*    (2006.01)
(52) U.S. Cl.
USPC .......................................... 718/100; 718/106
(58) Field of Classification Search
None
See application file for complete search history.

(56) References Cited

U.S. PATENT DOCUMENTS

| | | | |
|---|---|---|---|
| 7,200,620 B2* | 4/2007 | Gupta ................................... | 1/1 |
| 7,765,547 B2* | 7/2010 | Cismas et al. ................ | 718/100 |
| 2004/0163083 A1 | 8/2004 | Wang et al. | |
| 2005/0027914 A1* | 2/2005 | Hammalund et al. ........ | 710/260 |
| 2005/0223199 A1* | 10/2005 | Grochowski et al. ......... | 712/235 |
| 2006/0005197 A1 | 1/2006 | Saha et al. | |

OTHER PUBLICATIONS

B. Saha, A-R. Adl-Tabatabai, R. L. Hudson, C. C. Minh, and B. Hertzberg, McRT-STM: A High Performance Software Transactional Memory System for a Multi-Core Runtime, International Symposium on the Principles and Practice of Parallel Programming, Mar. 2006.
Harris, T., and Fraser, K., Language support for lightweight transactions, In Object-Oriented Programming, Systems, Languages & Applications (OOPSLA '03) (Oct. 2003), pp. 388-402.
K. Fraser, Practical Lock-Freedom, PhD dissertation and Technical Report UCAM-CL-TR-579, Feb. 2004.
N. Shavit and D. Touitou, Software Transactional Memory, Distributed Computing 10(2):99-117, 1997.
T. Harris, K. Fraser, and I. Platt, A Practical Multi-Word Compare and Swap Operation, In Proceedings of the 16th International Symposium on Distributed Computing (Oct. 2002).
V. Luchangco, M. Moir, and N. Shavit, Nonblocking k-compare-single-swap, In Proceedings of the fifteenth annual ACM symposium on Parallel algorithms and architectures, pp. 314-323 (San Diego, CA), 2003.
U.S. Appl. No. 11/395,884, filed Mar. 31, 2006, to Ziang Zou et al, for "A Programmable Event-Driven Yield Mechanism".
U.S. Appl. No. 11/134,687, filed May 19, 2005, to Xiang Zou et al., for "A Programmable Event-Driven Yield Mechanism Which May Activate Service Threads".
U.S. Appl. No. 11/254,286, filed Oct. 19, 2005, to Quinn Jacobson et al., for "Technique for Thread Communication and Synchronization".
Extended Search Report received for European Patent Application No. 07252661.9, mailed on Dec. 7, 2011, 11 pages.

(Continued)

*Primary Examiner* — Meng An
*Assistant Examiner* — Eric C Wai
(74) *Attorney, Agent, or Firm* — Shireen Irani Bacon

(57) ABSTRACT

Various usage models are provided to utilize a Monitor and Call ("mcall") instruction that incorporates user-level asynchronous signaling. The various usage models utilize the mcall instruction in a multithreading system in order to enhance concurrent thread execution. Other embodiments are also described and claimed.

20 Claims, 11 Drawing Sheets

OTHER PUBLICATIONS

Shriraman et al., "Hardware Acceleration of Software Transactional Memory", Technical Report #887, Mar. 2006, pp. 1-22.

McDonald et al., "Architectural Semantics for Practical Transactional Memory", 33rd International Symposium on Computer Architecture (ISCA'06): 2006, 12 pages.

Wang et al., "Helper Threads Via Virtual Multithreading", Published by the IEEE Computer Society, IEEE Micro, Nov.-Dec. 2004, pp. 74-82.

Office Action Received for European patent Application No. 07252661.9, Mailed on Dec. 14, 2012, 6 pages.

* cited by examiner

CONCURRENT THREAD EXECUTION USING USER-LEVEL ASYNCHRONOUS SIGNALING

BACKGROUND

1. Technical Field

The present disclosure relates generally to information processing systems and, more specifically, to improvement of concurrent thread execution using user-level asynchronous signaling.

2. Background Art

Increasingly, multithreading is supported in hardware. For instance, in one approach, multiple processors (thread units) in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors (thread units) to operating systems and user programs. For SMT, multiple software threads can be active and execute simultaneously on a single processor without switching.

For a system that supports concurrent execution of software threads, such as SMT and/or CMP systems, an application may be parallelized into multi-threaded code to exploit the system's concurrent-execution potential. An otherwise single-threaded program may be parallelized into multi-threaded code by organizing the program into multiple threads and then concurrently running the threads, each thread on a separate thread unit. The threads of a multi-threaded application may need to communicate and synchronize, and this is often done through shared memory.

To parallelize code, speculative decisions may be made regarding whether a block of code is dependent on other code running concurrently on other threads. Processors can make this more efficient by providing support for detecting dependencies. For example, a processor may provide support to detect whether a speculative block of code reads any memory location that is subsequently modified by another concurrent thread. One common solution to accessing shared data in multiple core or multiple logical processor systems comprises the use of software locks to guarantee mutual exclusion across multiple accesses to shared data.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to enhance concurrent thread execution with hardware-based user-level asynchronous signaling.

DETAILED DESCRIPTION

The following discussion describes selected embodiments of methods, systems and mechanisms to provide hardware-based user-level asynchronous signaling to support concurrent thread execution. The apparatus, system and method embodiments described herein may be utilized with single-core or multi-core multithreading systems. In the following description, numerous specific details such as processor types, multithreading environments, system configurations, data structures, and instruction mnemonics and semantics have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

For multi-threaded workloads that exploit thread-level speculation, at least some, if not all, of the concurrently executing threads may share the same memory space. As used herein, the term "cooperative threads" describes a group of threads that share the same memory space. Because the cooperative threads share memory space, they may read and/or write to the same memory items. Accordingly, concurrently-executed cooperative threads should be synchronized with each other in order to do correct, meaningful work.

Figure 1:
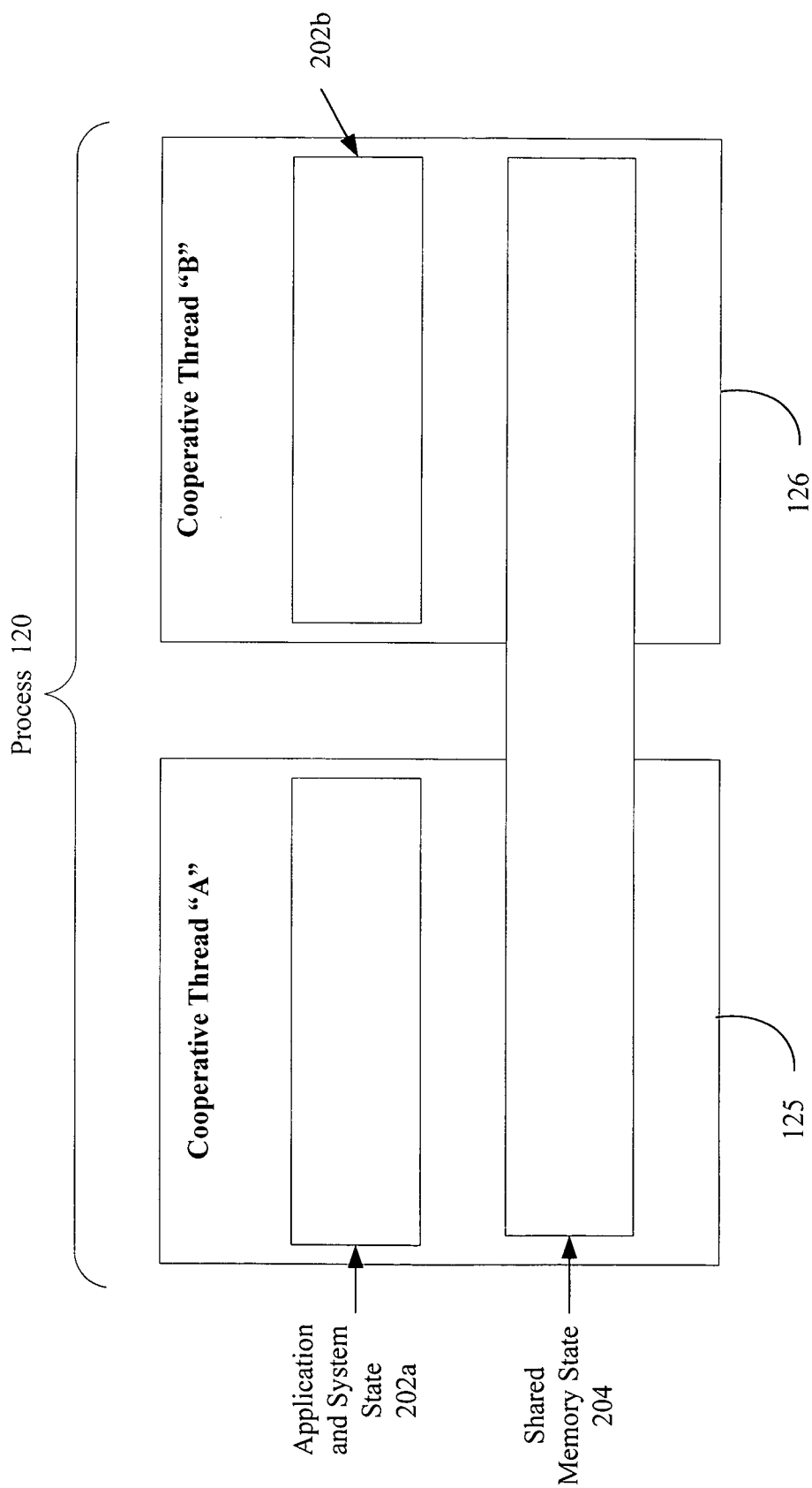
FIG. 1 is a block diagram presenting a graphic representation of a general parallel programming approach.

FIG. 1 is a block diagram illustrating, in graphical form, two cooperative threads 125, 126 that share a common logical view of memory. Such a shared-memory multiprocessing paradigm may be used in an approach referred to as parallel programming. According to this approach, an application programmer may split a software program, sometimes referred to as an "application" or "process," into multiple threads to be run concurrently in order to express parallelism for the software program. That is, an otherwise single-threaded program, or "process" 120, may be broken up into two (or more) threads 126, 125 that may execute concurrently.

FIG. 1 illustrates that each thread 125, 126 has its own application and system state 202a, 202b, respectively. A particular logical view 204 of memory is shared by the cooperative threads 125, 126 associated with a particular process 120. Accordingly, for at least one embodiment, the cooperative threads 125, 126 may each share the same view of virtual memory that is constructed by the operating system for the process 120 and may have visibility to each others' virtual address space.

FIG. 1 illustrates, for simplicity of discussion, only two threads 125, 126 for a process 120. However, such example illustration should not be taken to be limiting. The number of cooperative threads associated with a process 120 may be more than two. The upper bound on the number of threads associated with a process 120 may be limited by an OS program (not shown).

Various approaches have been devised to deal with synchronization of memory accesses for cooperative threads. One approach for dealing with the synchronization of cooperative threads is the use of mutual exclusion memory locks in software (mutex-based synchronization). Memory locks may be used to guarantee that a particular thread has exclusive access to shared data for a particular section of code. In traditional multi-threaded algorithms, locks may be used around any critical section of code that may ever cause incorrect behavior if multiple threads execute critical sections concurrently. For such approach, a thread may acquire the lock, execute its critical section, and then release the lock. Performance can be degraded by locks because they can inhibit multiple threads from running concurrently. Performance can be further degraded if, "just to be safe", locks are held more than necessary. That is, locks may often be used rather pessimistically.

As an alternative approach to locking schemes discussed above, transactional execution has emerged. Software-based transactional programming provides an alternative synchronization construct in the form of a new language construct or API. Under a transactional execution approach, a block of instructions may be demarcated as an atomic block and may be executed atomically without the need for a lock. (As used herein, the terms "atomic block", "transaction", and "transactional block" may be used interchangeably.) The programmer uses the new language construct or API to mark the regions or operations of the program that should execute atomically and relies on the underlying system to ensure that their execution is indeed completed without data contention from other threads.

Semantics may be provided such that either the net effects of the each of demarcated instructions are all seen and committed to the processor state, or else none of the effects of any of the demarcated instructions are seen or committed. The transactional system may ensure atomicity of the demarcated instructions by monitoring the memory locations accessed by different threads (data versioning). It allows non-conflicting operations to proceed in parallel, and rolls back conflicting operations (while avoiding deadlock). Transactional execution thus provides fine-grained concurrency while ensuring atomicity—for example, two threads updating different buckets in the same hash table can execute concurrently, while two threads updating the same bucket execute serially.

Runtime primitives may be used to support the various semantics for transactional memory. These primitives include the ability to start a transaction, read and write values within a transaction, abort a transaction, and commit a transaction. Runtime transactional primitives can be provided in a transaction system either by hardware or software. If the primitives are provided by hardware, the transaction system may be referred to as a hardware transactional memory (HTM) system. If the primitives are provided by software, the transaction system may be referred to as a software (STM) system.

Even for an STM system where transactions are controlled fundamentally by software, certain hardware optimizations may be implemented in order to enhance performance in a STM system.

Figure 2:
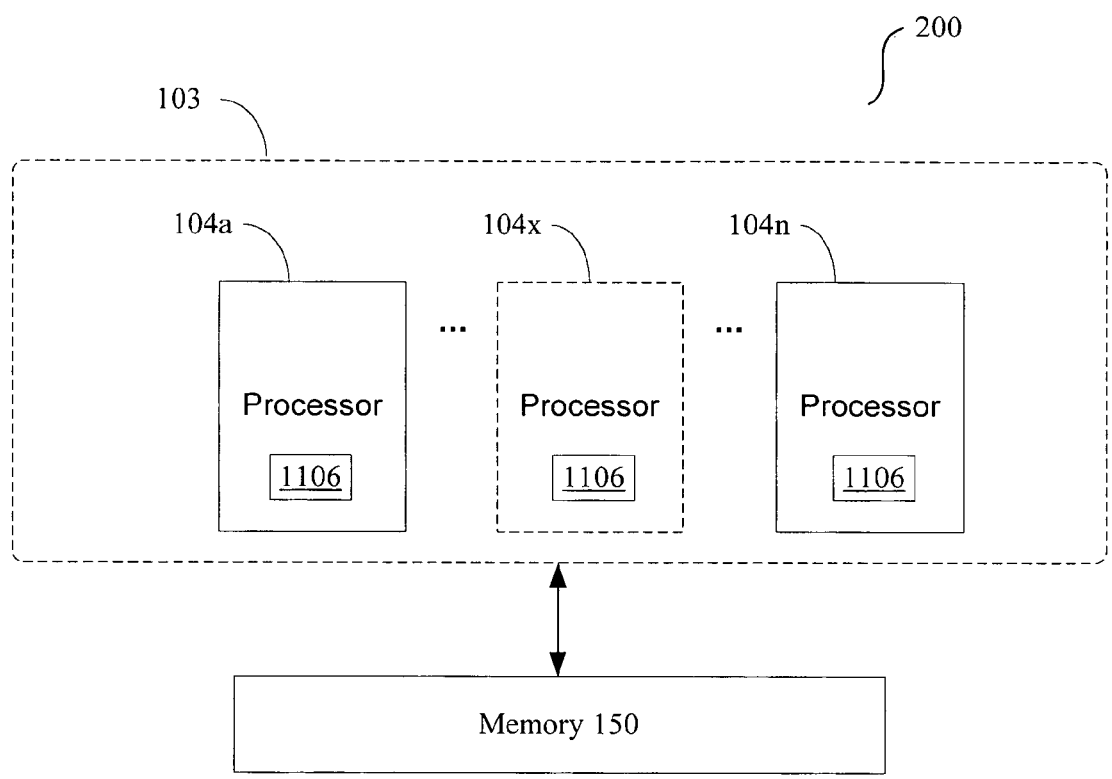
FIG. 2 is a block diagram illustrating selected features of a chip multiprocessor system according to at least one embodiment of the present invention.

FIG. 2 is a block diagram representing a multi-threaded processor system 200, such as a chip multi-processor system, that includes hardware features to provide user-level asynchronous signaling among thread units. The signaling among thread units is asynchronous in the sense that an action performed by one thread unit may disrupt operation of a second thread unit, regardless of which instructions are being executed on the second thread at the time of the disruption. The processor system 200 thus supports concurrent execution of more than one thread at a time. As used herein, the term "thread" includes, at least, the concept of independent execution of a stream of instructions that may be executed concurrently with other threads of a process. The "thread" term encompasses the idea, therefore, of execution of a software instruction stream along with the associated processor state.

For at least on embodiment, the processor system 200 may execute a portion of an application's code that has been parallelized through the use of cooperative threads. FIG. 2 illustrates at least one CMP embodiment, where each of multiple thread units 104 is a processor core, with the multiple cores 104a-104n residing in a single chip package 103. Each core 104 may be either a single-threaded or multi-threaded processor.

For at least one alternative embodiment, the processor 200 system may be a single-core system that supports concurrent multithreading (such as, e.g., an SMT processor system). For such embodiment, each thread unit 104 is a logical processor having its own next-instruction pointer and fetch logic, although the same processor core executes all thread instructions. (The terms "thread unit" and "hardware thread of control" may be used interchangeably herein). For such embodiment, the logical processor 104 is considered a "thread unit" and maintains its own version of the architecture state, although execution resources of the single processor core are shared among all threads.

One skilled in the art will recognize that the asynchronous signaling-based threading enhancements embodiments discussed herein may be utilized in any multithreading approach, including SMT, CMP multithreading or other multiprocessor multithreading, or any other known multithreading approach.

While the CMP embodiments of processor 200 system discussed herein refer to only a single thread per processor core 104, it should not be assumed that the disclosures herein are limited to single-threaded processors. The techniques discussed herein may be employed in any CMP system, including those that include multiple multi-threaded processor cores in a single chip package 103. For simplicity of discussion, a CMP embodiment is discussed in further detail herein.

FIG. 2 illustrates that the processor system 200 includes two or more thread units 104a-104n. For purposes of discussion, the number of thread units is referred to as "N." The optional nature of thread units 104 in excess of two such thread units is denoted by dotted lines and ellipses in FIG. 2. That is, FIG. 2 illustrates $N \geq 2$.

Each thread unit 104 illustrated in FIG. 2 may be representative of 32-bit and/or 64-bit processors such as Pentium®, Pentium® Pro, Pentium® II, Pentium® III, Pentium® 4, and Itanium® and Itanium® 2 microprocessors. Such partial listing should not, however, be taken to be limiting. Additional details for an example embodiment of a processor 104 may be seen in FIG. 11.

The embodiment of a processor 200 system illustrated in FIG. 2 is designed to provide certain hardware features that may be utilized to enhance performance of software transactional modules. (Each is discussed in further detail below). While certain specific implementations of such features are discussed below, it should be understood that such implementation details are provided for purposes of example only and should not be taken to be limiting.

First, the thread units 104 of the system 200 provide user-level asynchronous signaling. Certain embodiments of such signaling mechanisms are further described in co-pending application Ser. No. 11/395,884, "A PROGRAMMABLE EVENT-DRIVEN YIELD MECHANISM" and Ser. No. 11/134,687, "A PROGRAMMABLE EVENT DRIVEN YIELD MECHANISM WHICH MAY ACTIVATE SERVICE THREADS". A user-level asynchronous mechanism may report certain events or combinations of events ("scenarios") directly to a user-level thread running on a microprocessor without requiring the traditional intervention of the operating system. Such user-level interrupts or user-level exceptions are based on a hardware mechanism that saves sufficient information about the current state of the thread and redirects the thread to execute a pre-determined block of "handler" code to respond to the event. As part of the handler code the thread can perform any work it wishes to do and then return to the execution path it was on before the event. It may also choose to not return the execution path and instead continue to an entirely different set of tasks Second, the instruction set architecture ("ISA") of the thread units 104a-104n of the processor system 200 supports a Monitor and Call ("mcall") instruction. Certain aspects of embodiments of an mcall instruction that utilizes the hardware features of user-level asynchronous signaling are further described in co-pending application Ser. No. 11/254,286, "TECHNIQUE FOR THREAD COMMUNICATION AND SYNCHRONIZATION.", filed Oct. 19, 2005. Embodiments of the mcall instruction supported by the processor 200 allow a thread to monitor a specified address and force a control transfer to take place (asynchronous to the current instruction flow) when another thread updates the monitored memory location.

Broadly, the mcall instruction supported by the ISA of processors 104a-104n can be defined as follows:
  mcall(void*address, vector_ip)
The mcall instruction takes as input parameters an address and an instruction pointer. After the mcall instruction is executed by one of the thread units, such as unit 104a, the thread unit 104a starts to monitor the address. If at a later time any other thread unit, such as 104n, performs a write operation (such as, for example, by executing a store instruction) into the monitored address, then the first thread unit 104a asynchronously starts executing from the instruction pointer ("vector_ip"), passed in as the second argument. This asynchronous control transfer may be accomplished via hardware of the processor 200 in response the satisfaction of a "scenario" as explained above.

During execution of the mcall operation, the first thread unit 104a saves the instruction pointer of the currently executing instruction before starting execution of user-level handler code at the vector_ip. A thread unit 104 may execute a number of mcall instructions; this sets up a number of memory locations to be monitored. A store into any of the monitored locations by another thread unit may cause execution to be vectored to the corresponding instruction pointer for user-level handler code.

At least one embodiment of the processor 200 therefore provides an instruction or procedure (mcall) which, as is described herein, may form the basis of a software-based atomic compare-and-swap (CAS) operation (described immediately below). Further, described herein is an atomic multi-location (e.g., k locations) compare and a single-location swap operation, referred to as an atomic k-location-compare single-swap ("kcss") operation.

CAS

The CAS function takes three input parameters: an address, the expected value at that address ("old value"), and a new value for the address ("new value"). If the contents of the address equal the old value, then the value of the address is updated to hold the new value. Such operation is illustrated by the following pseudocode shown in Table 1:

TABLE 1

CAS (addr, oldval, newval):
  If (contents (addr) == oldval);
    Set addr = newval.

The CAS operation may be a software-based operation that is based on an ISA-level instruction such as a single-location compare-and-exchange (lock_cmpxchg) instruction. The CAS function may be therefore be implemented, for at least one embodiment, on a processor that provides an atomic compare-and-exchange instruction. For such embodiment, a "lock" prefix may be utilized in order to indicate that the compare-and-exchange operation should be performed atomically. The compare-and-exchange instruction (cmpxchg) operates to compare the value in a register with a destination operand. If the two values are equal, the source operand is loaded into the destination operand and the Zero Flag for the processor is set to "true". Otherwise, the Zero Flag is cleared and the destination operand is loaded into the register.

Mcall and KCSS

The ability to do an atomic k-compare single-swap operation in hardware significantly enhances the ability to implement sophisticated synchronization algorithms for software transactional memory. For example, using a k-compare single-swap one can implement a non-blocking multi-set. Known non-blocking implementations of operations on sets using a compare and swap instruction involve very complex algorithms; these can be written easily using a k-compare single-swap.

The pseudocode shown in Table 2, below, shows at least one embodiment of an implementation of a k-compare single-swap function using the mcall instruction. It atomically checks that k memory locations have the expected value, and if so, swaps in the new value into the kth location. It returns True if the swap succeeded, else it returns False.

TABLE 2

Figure 3:
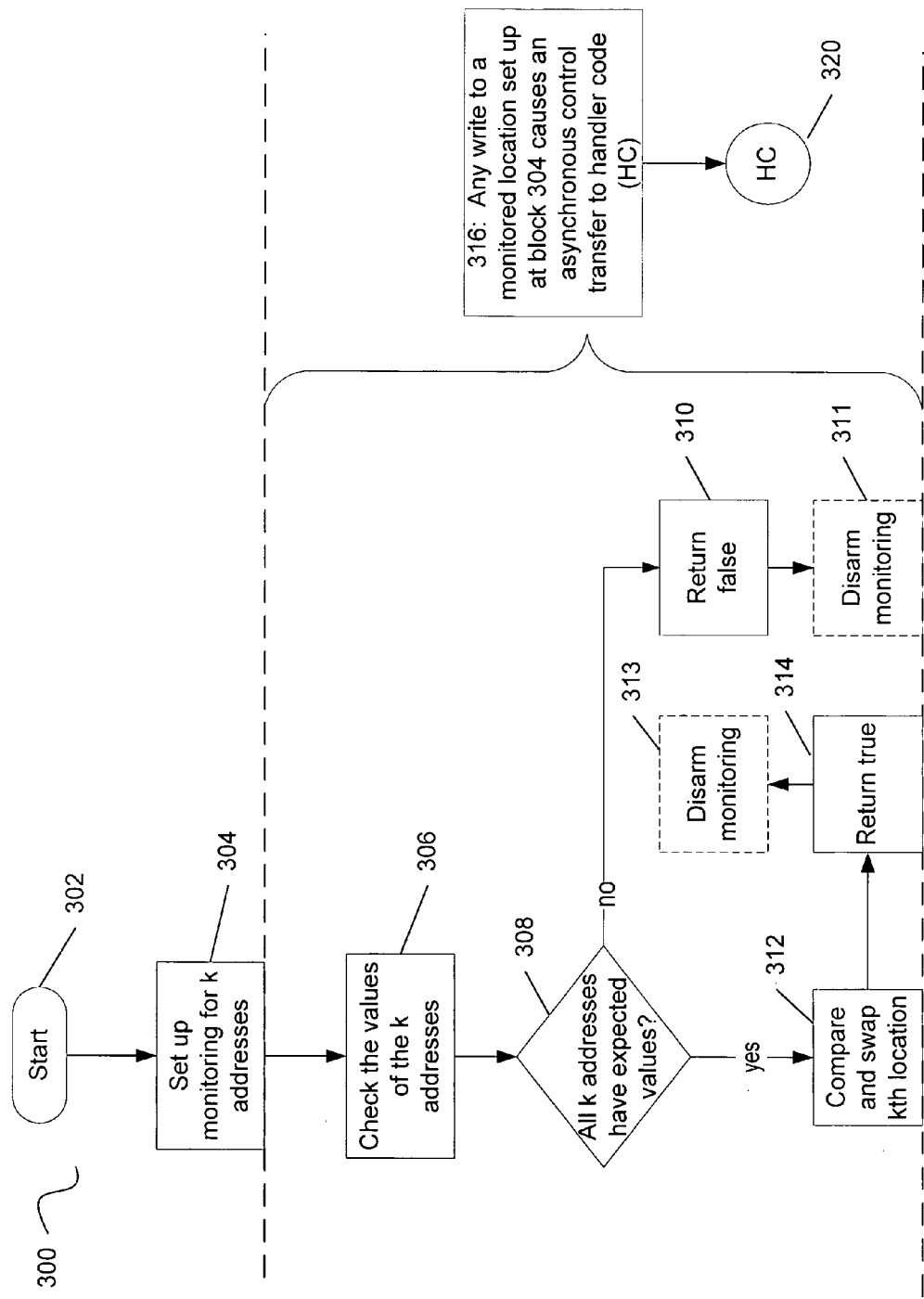
FIG. 3 is a flowchart illustrating at least one embodiment of a method for performing a k-compare single-swap (kcss) operation using user-level asynchronous signaling.

| FIG. 3 block | K-compare Single-swap Pseudocode |
|---|---|
|  | /* k is the number of monitored locations */<br>/* addr[ ] is an array that contains the set of monitored addresses */<br>/* cmp[ ] is an array that contains the values that the monitored addresses must have for the swap to succeed. In other words cmp[ ] is the array of comperands */<br>/* new is the value to be swapped in at the kth location if all the comparisons succeed */ |
| 300 | Bool kcss(int k, void* addr[ ], int cmp[ ], int new)<br>{ |
| 304 | for (int i = 0; i < k; i++)<br>  mcall(addr[i], kcss_handler_ip); /* set up monitor for all k addresses */ |

TABLE 2-continued

| FIG. 3 block | K-compare Single-swap Pseudocode |
|---|---|
| 306 | start_check: |
|  | for (int i = 0; i < k; i++) { |
|  | if (*addr[i] != cmp[i]) |
| 310 | return False; |
|  | } |
| 312 | If (compare_and_swap(addr[k], cmp[k], new)) |
|  | return True |
|  | else |
| 310 | return False; |
|  | } |

The kcss routine takes an array of addresses, comperands, and the new value ("new") to be swapped in. It first sets up the monitoring for all the addresses using the mcall instruction, and then checks the values and does the single-swap at the end. If any processor writes into any of the monitored locations in the interim, execution vectors to kcss_handler_ip. The handler checks whether the compare and swap operation had completed prior to transferring to the handler, and accordingly return True or False.

FIG. 3 is a flowchart illustrating at least one embodiment of a method 300 for performing the kcss operation of the kcss. FIG. 3 illustrates that the method 300 begins at block 302 and proceeds to block 304. At block 304, a monitor instruction (e.g., mcall) is executed for each of the k locations to be monitored. As is explained above, the mcall instruction utilizes asynchronous hardware signaling to effect an asynchronous control transfer if another thread unit (e.g., SMT logical processor or CMP processor) performs a write to one of the k monitored locations.

Accordingly, FIG. 3 illustrates that, at block 316, an asynchronous transfer of control to handler code is performed if any other cooperative thread writes to one of the k monitored locations. (The handler code 320 is discussed in further detail below in connection with FIG. 6.) It should be noted that the handler code 320 is not invoked if the same thread that is performing the method 300 performs a write to one or more of the monitored locations. FIG. 3 illustrates that the method 300 proceeds from block 304 to block 306.

At block 306, the value at each of the k monitored locations is checked to determine whether the value at each of the k locations matches an expected value for that location. Brief reference to FIG. 4 gives further background regarding one example of the block 306 processing.

Figure 4:
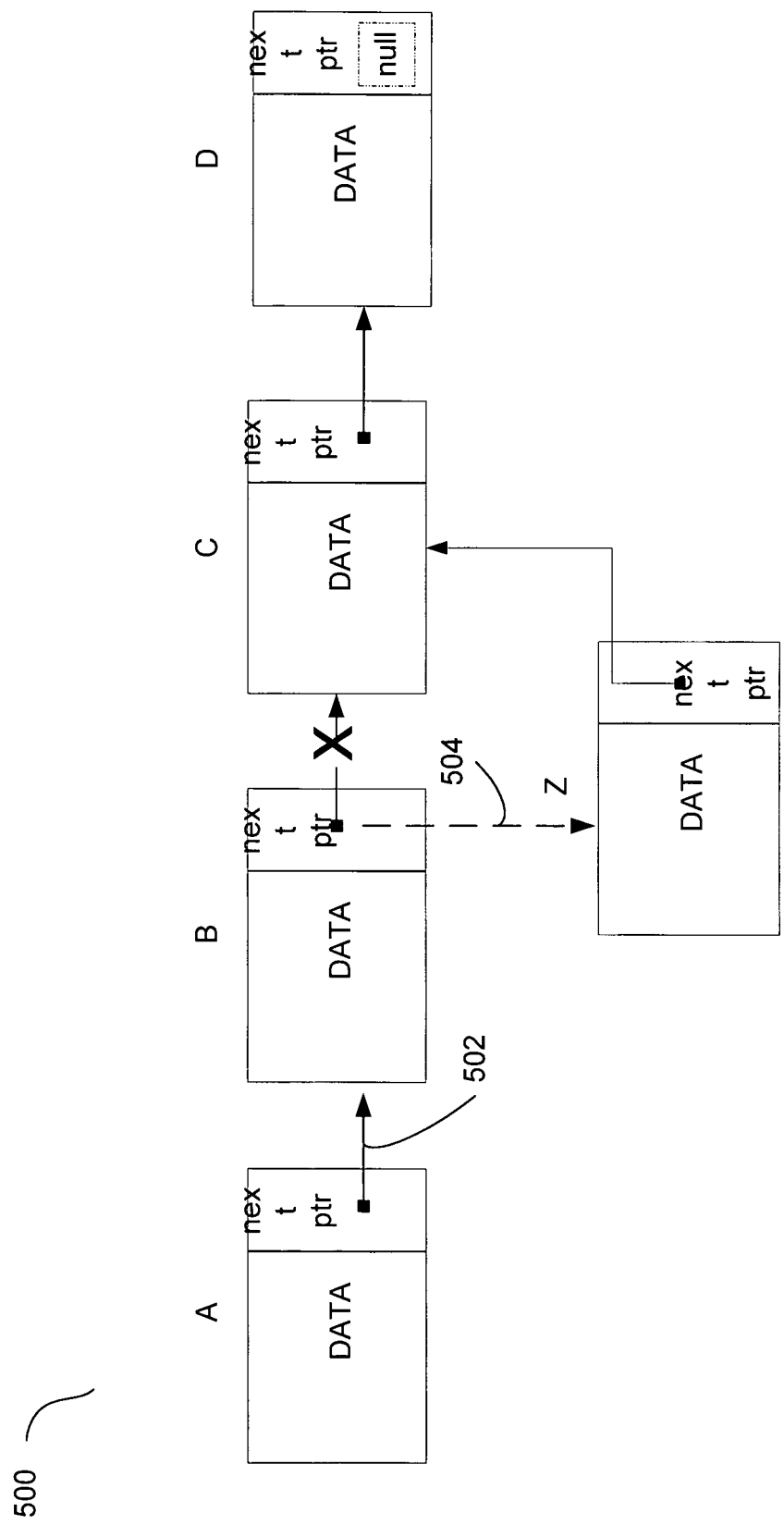
FIG. 4 is a block diagram illustrating at least one example of an embodiment of a linked list having k locations to be monitored by a kcss operation.

FIG. 4 is a block diagram illustrating at least one example embodiment of linked list 500 having four nodes A, B, C and D. The list 500 illustrated in FIG. 4 is a linked list, such that each node A, B, C, D includes a pointer (next ptr) to its successor node.

For at least some software-based transaction execution approaches, putting a linked list 500 in a critical section blocks all other threads from accessing any node of the list 500 while one thread has acquired a lock on it. Thus, even if other threads are interested in updating different nodes of the list 500, they are blocked from doing so under a traditional blocking software transaction approach until the first thread releases the lock. The result is that only one thread at a time can access the linked list 500, even if various threads need to access different parts of the list in a manner that would not interfere with each other.

The kcss operation provides a way to atomically implement changes to a node of the linked list 500 without blocking access to the entire list 500 from other threads. It should be noted that the linked list examples set forth in FIG. 4 is selected from many examples of potential usage models for a kcss operation. Other usage models, such as hash tables and the like, will be apparent to one of skill in the art.

FIG. 4 illustrates an example wherein a new node Z is inserted into a linked list 500 between nodes B and C. For the insertion, the following operations should be performed:

1) generate the new node Z. The "next pointer" for the new node points to C;

2) update B.next to point (504) to the new node Z.

At the time of performing the second step of updating B.next to point to the new node one should make sure that node B is still pointed to by node A.next (502) to ensure that that node B itself has not been removed. One should also make sure, at the time one wants to update B.next to point (504) to the new node Z, that B.next is currently still pointing to node C.

Returning to FIG. 3, the method 300 thus checks 306 the values of the k monitored locations to determine whether the values are as expected. For the example shown in FIG. 4, for example, the method 300 determines at block 306 whether the value at A.next==node B and whether the value at B.next==node C. Processing then proceeds to block 308.

At block 308, it is determined whether all k locations had the expected value. If not, then the kcss operation cannot succeed, and a "false" value is returned from the kcss operation at block 310.

If, however, it is determined at block 308 that all k locations had the expected value, then processing proceeds to block 312. At block 312, the value at the kth location is "swapped" or modified to reflect the value passed in as the new value (see "int new" in Table 2, above). For the example shown in FIG. 4, for example, the swap causes B.next to point to the new node Z. Processing then proceeds to block 314, where a "true" value is returned from the kcss operation 300 to indicate that the swap has been successfully performed.

FIG. 3 further illustrates optional processing blocks 311, 313. The optional nature of such processing is denoted with broken lines in FIG. 3. Blocks 311 and 313 illustrate that the monitoring of the k locations that was set up at block 304 may be disarmed at the end of the kcss routine. In an alternative embodiment, the disarming 311, 313 is not performed during the kcss routine 300. Instead, for such embodiment, the disarming 311, 313 is performed after the kcss routine by a wrapper (not shown) that calls the kcss routine and then performs the disarming after the kcss routine returns control to the wrapper.

Figure 6:
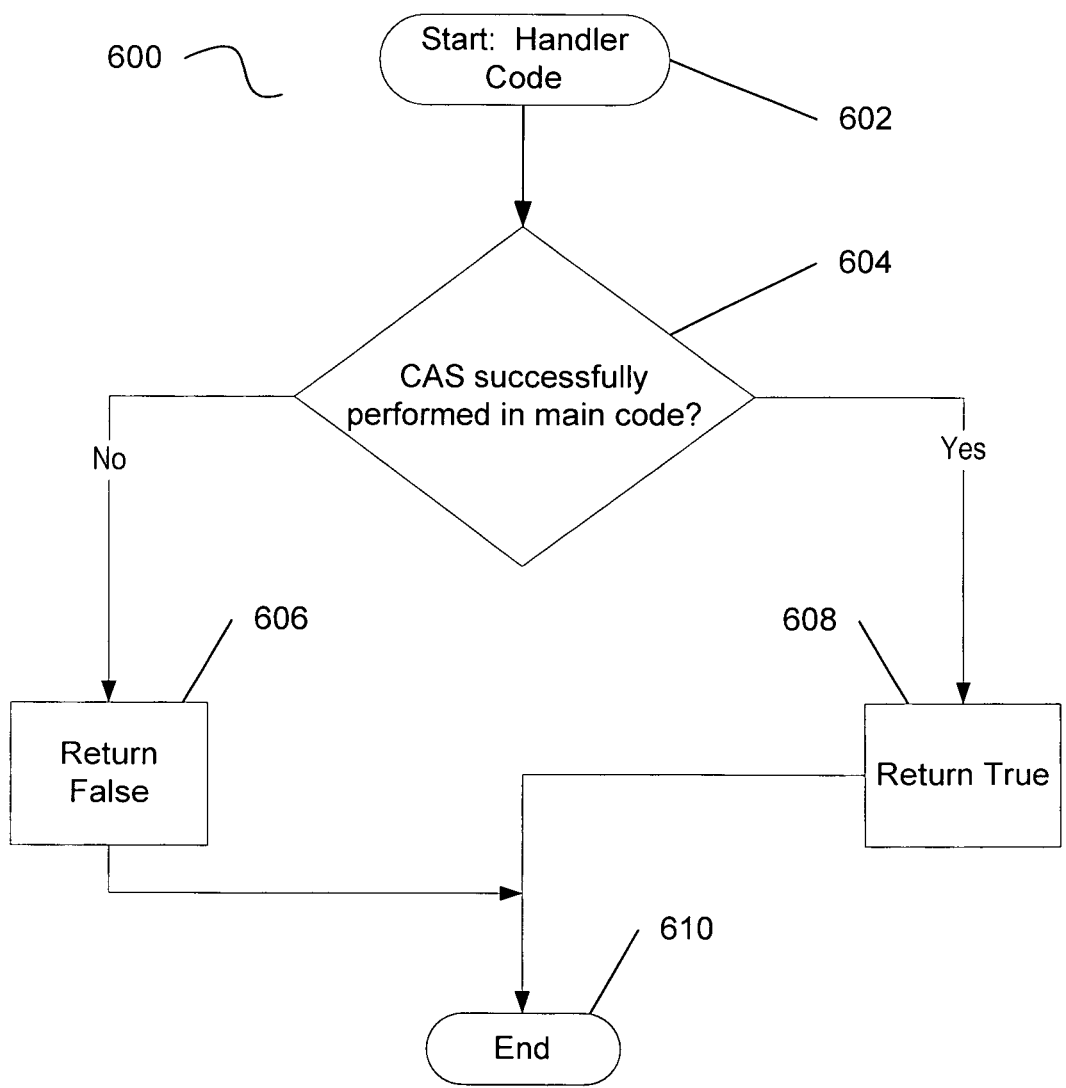
FIG. 6 is a flowchart illustrating at least one embodiment of a method for handling an asynchronous control transfer caused by a foreign write during a kcss operation.

KCSS Handler code: FIG. 6 is a flowchart that illustrates at least one embodiment of a method 600 for performing handler code 320 (FIG. 3) if an asynchronous control transfer occurs at block 316 of FIG. 3. FIG. 6 illustrates that the method begins at block 602 and proceeds to block 604.

Regarding block 604, it should be noted that the asynchronous control transfer 316 (FIG. 3) is performed only if another thread has performed the write (referred to herein as a "foreign" write), which may have occurred either before or after the compare-and-swap of the kth location at block 312 of FIG. 3. If the foreign write has occurred before the CAS operation 312 (FIG. 3), then the atomic kcss operation has failed. Otherwise, if the foreign write has occurred after the CAS operation 312 (FIG. 3) has been completed, then the kcss operation has been successful. (Because the "lock" prefix makes the cmpxchg operation for the CAS operation atomic, the conflicting write cannot occur during the cmpxchg operation).

Accordingly, at least one embodiment of the method 600 for the handler code 320, as illustrated in FIG. 6, determines at block 604 if the CAS operation was successfully completed before the foreign write caused the asynchronous control transfer (see 316, FIG. 3) that caused the handler code 320 to be invoked. The determination 604 may be made in any manner that conforms with the operational parameters of the CAS routine used for a particular embodiment.

For at least one embodiment, the lock_cmpxchg instruction is utilized to perform the CAS operation 312 (FIG. 3) for the $k^{th}$ location. Thus, at block 604 a check is made to determine the state of the zero flag. As is indicated above, at least one embodiment of the lock_cmpxchg instruction sets the zero flag if the instruction is successfully completed.

The check at block 604 uses this property to determine whether the CAS operation 312 (FIG. 3) was completed before the asynchronous control transfer 316 (FIG. 3). If the zero flag is false, then the foreign write occurred before the CAS operation successfully completed. That is, if the zero flag remains unset (false), the evaluation at block 604 evaluates to "false."

If, on the other hand, the zero flag is true at the time of the evaluation at block 604, then the foreign write occurred after the CAS operation was successfully completed and the zero flag was set. If the zero flag is set (true) at the time of the evaluation at block 604, then the evaluation at block 604 evaluates to "true."

FIG. 6 illustrates that, if the evaluation at block 604 evaluates to false, processing proceeds to block 606, where a "false" value is returned as the Boolean value of the kcss routine. In contrast, if the evaluation at block 604 evaluates to true, processing proceeds to block 608 where a "true" value is returned. Processing then ends at block 610.

FIG. 6 illustrates an embodiment of the method 600 in which a "false" value is returned from the kcss operation if another thread has stored a value to one of the monitored locations before the kcss operation has completed execution. One of skill in the art will recognize that this is a conservative approach that assumes that the foreign write operation would cause one or more of the k pointer values to be different than expected.

However, an alternative embodiment of the method 600 may incorporate a less conservative approach, which comprehends that some write operations may not cause the pointer values to change to an unexpected value. For such alternative embodiment, alternative processing may be performed when the evaluation at block 604 evaluates to false. Instead of proceeding to block 606 as shown in FIG. 6, processing for the alternative embodiment may jump to the "start_check" portion of Table 2, which corresponds to block 306 of FIG. 3. For such embodiment, by jumping to the "start_check" block 306, it may be confirmed whether the foreign write caused an unexpected value, rather than assuming this to be the case.

Pseudocode for at least one embodiment of a user handler code routine that may be utilized to implement the method of FIG. 6 is shown below in Table 3.

TABLE 3

| FIG. 6 block | Handler Pseudocode |
|---|---|
| | kcss_handler_ip: |
| |     asm___{add $4, %esp}; |
| |     /* adjust the esp since the processor pushed the ip |
| 604 | into the stack */ |
| 606 | If (compare_and_swap succeeded) |
| |     return True; |
| 608 | else |
| |     return False; |

Mcall and STM Abort

Software transactional memory (STM) implementations may provide the following basic functions: stmStart, stmRead, stmWrite, stmAbort, stmCommit, and stmValidate. The stmStart function starts the transaction and sets up the data structures, while stmRead and stmWrite are used to monitor the addresses being touched inside a transaction. The stmAbort function aborts the current transaction and stmCommit tries to commit the current transaction. The stmCommit function returns True if the transaction commits successfully, else it returns False. The above functions may closely mimic what happens in a hardware transaction implementation.

The stmValidate function is an additional function that may be provided by software transactional systems. The stmValidate function checks whether there have been any conflicting writes into a transaction's read set during execution of the transaction. The stmValidate function is provided to make transactional processing more efficient in the case of a data conflict.

That is, in a traditional software transactional system, when a data conflict arises, the conflicted transaction (referred to in this discussion as Tr1) does not get notified immediately. Only Tr1's descriptor gets changed, and Tr1 becomes aware of the conflict only when it checks its descriptor (for example, during the commit stage). One of skill in the art will recognize that the term "descriptor" is used broadly herein to encompass any validation record, including those that include tables, versioning, time stamps, or the like.

In order to avoid unnecessarily spending processing resources to perform a transaction whose read set has experienced a conflicting write, it would be beneficial to know about the conflict before executing Tr1 all the way to the commit stage. Otherwise, a thread may raise spurious exceptions or go down an erroneous control path while executing a transaction that will be aborted at commit time. To prevent this, STM systems may perform periodic validation of the transaction, which is implemented by inserting code during compilation to periodically poll the transaction descriptor. The stmValidate code may perform this periodic polling.

For example, the following code sequence would enter into an infinite loop in some software transactional memory systems if the value of variable x is one less than the value of variable y, even though it would not enter the loop in a HTM:

| Thread 1 | Thread 2 |
|---|---|
| atomic { | atomic { |
|   if (x != y) |   x++; |
|     while (true) { } |   y++; |
| } | } |

Similar problems exist for many implementations of software transactional memory systems.

Figure 7:
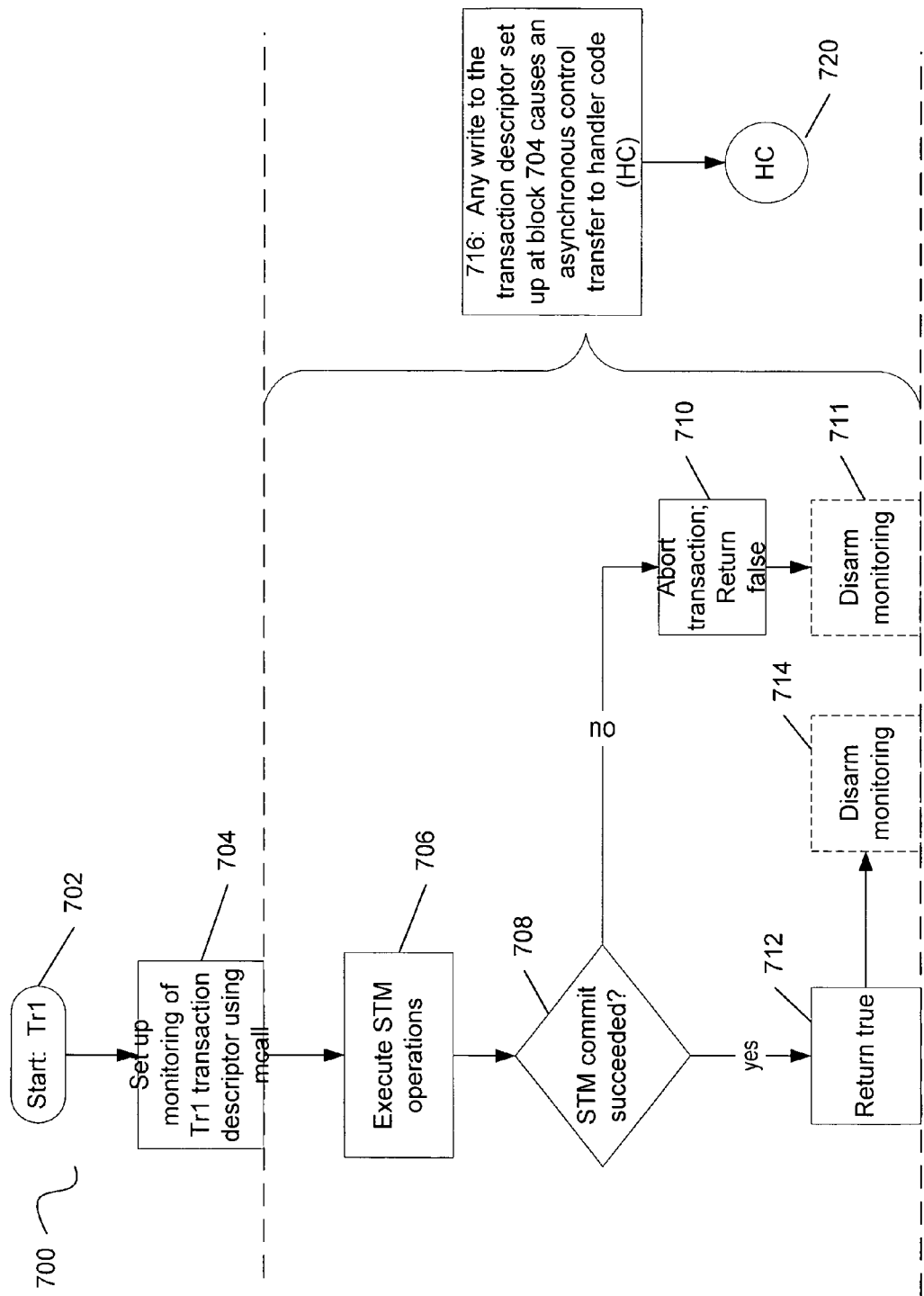
FIG. 7 is a flowchart illustrating at least one embodiment of a method for aborting a software transaction using a validation approach that employs user-level asynchronous signaling.

The inventors have determined that a usage model for at least one embodiment of the mcall instruction can be used to avoid the above problems. FIG. 7 illustrates at least one embodiment of a method 700 for implementing this usage model of the mcall instruction for transaction validation.

FIG. 7 is a block diagram illustrating at least one method 700 for utilizing an mcall instruction (which utilizes underlying asynchronous signaling hardware) to implement an asynchronous abort during software transactional processing. FIG. 7 illustrates that as a transaction (Tr1) is started 702, monitoring of the transaction descriptor for Tr1 is set up by performing an mcall for the descriptor (block 704). Processing then proceeds to block 706, wherein execution of a set of one or more instructions for the transaction is begun.

According to software transactional memory techniques, if another thread performs a conflicting write during execution 706 of Tr1 (breaking atomicity of Tr1), the other thread first changes the state of Tr1's transaction descriptor. Because of the mcall monitoring of this transaction descriptor that was set up at block 704, any foreign write to the Tr1 descriptor during execution of Tr1 immediately causes an asynchronous control transfer 716 to handler code 720. The foreign write to the Tr1 transaction descriptor means that the Tr1 transaction will not be able to complete because the conflicting memory write by the other thread has broken atomicity of Tr1. (One of skill in the art will recognize that the foreign memory write operation may be performed via a store instruction or any other memory modification instruction). When the first transaction Tr1 observes this conflicting memory write operation (via its observation of a foreign write to the transaction descriptor), the asynchronous control transfer 716 is immediately triggered.

The control transfer 716 is "immediate" in the sense that the system may become aware that atomicity of Tr1 has been broken before Tr1's normal checking of the descriptor at the commit stage 708. The normal operation of Tr1 may be thus interrupted when an interfering foreign write occurs. This processing 716 removes the need to periodically validate the transaction—if the transaction executes to completion at block 712, then the transaction may commit without the need to periodically validate the transaction.

FIG. 7 illustrates the "normal" validation processing at block 708, optional block 710, and block 711. During execution of STM operations at block 706, Tr1's memory writes are buffered. At block 708, it is determined whether any conflicting writes into Tr1's read sets were performed during execution 706 of the STM operations. For at least one embodiment, such validation 708 is performed by examining Tr1's transaction descriptor. If no conflicts have occurred, then the buffered writes are committed and processing proceeds to block 712. At block 712, a true value is returned for the transaction. FIG. 7 illustrates that optional processing 714 may also be performed if the transaction is successful. At block 714, the monitoring of the Tr1 transaction descriptor is disabled. As is explained above, such processing is optional in that it may be performed by a wrapper that calls the method 700.

FIG. 7 further illustrates that the commit determination at block 708 could instead evaluate to false. For example, if the transaction descriptor indicates that a conflicting write has been performed to a Tr1 read set, then the transaction has failed and the buffered writes are not committed. In such case, processing proceeds to block 710 where the transaction is aborted and a false value is returned for the transaction. The false value is a failure indicator for the transaction. Again, FIG. 7 illustrates that monitoring of the Tr1 transaction descriptor may be optionally disabled at block 711.

STM Abort Handler Code.

Figure 8:
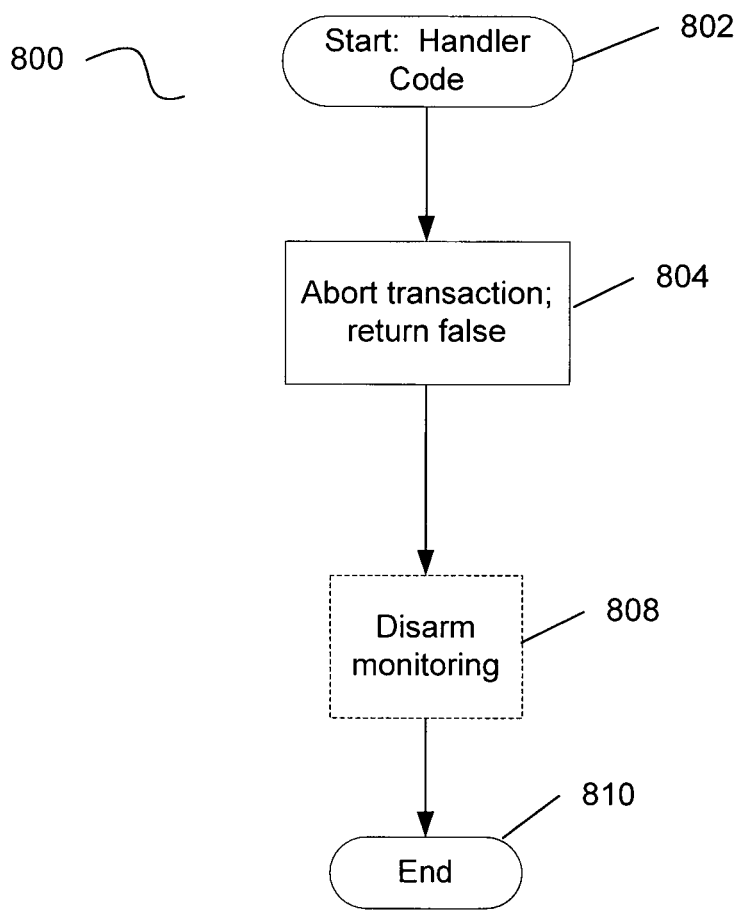
FIG. 8 is a flowchart illustrating at least one embodiment of a method for handling an asynchronous control transfer to perform transaction invalidation.

FIG. 8 is a flowchart that illustrates at least one embodiment of a method 800 for performing handler code 720 (FIG. 7) if an asynchronous control transfer occurs at block 716 of FIG. 7. The figure illustrates that the method 800 begins at block 802 and proceeds to block 804. At block 804, the transaction is aborted and a false value is returned for the transaction. FIG. 8 illustrates that monitoring of the transaction descriptor optionally may be disabled at block 808. (Alternatively, disabling of the monitoring may be performed by a wrapper as discussed above.) Processing then ends at block 810.

Mcall and Priority Inversion

Priority inversion occurs when a lower-priority thread acquires a software lock and thereby prevents a higher-priority thread from accessing data. A third usage model of the mcall instruction may be utilized to allow the higher-priority thread to asynchronously abort the lower-priority thread in order to alleviate the priority inversion condition.

Figure 9:
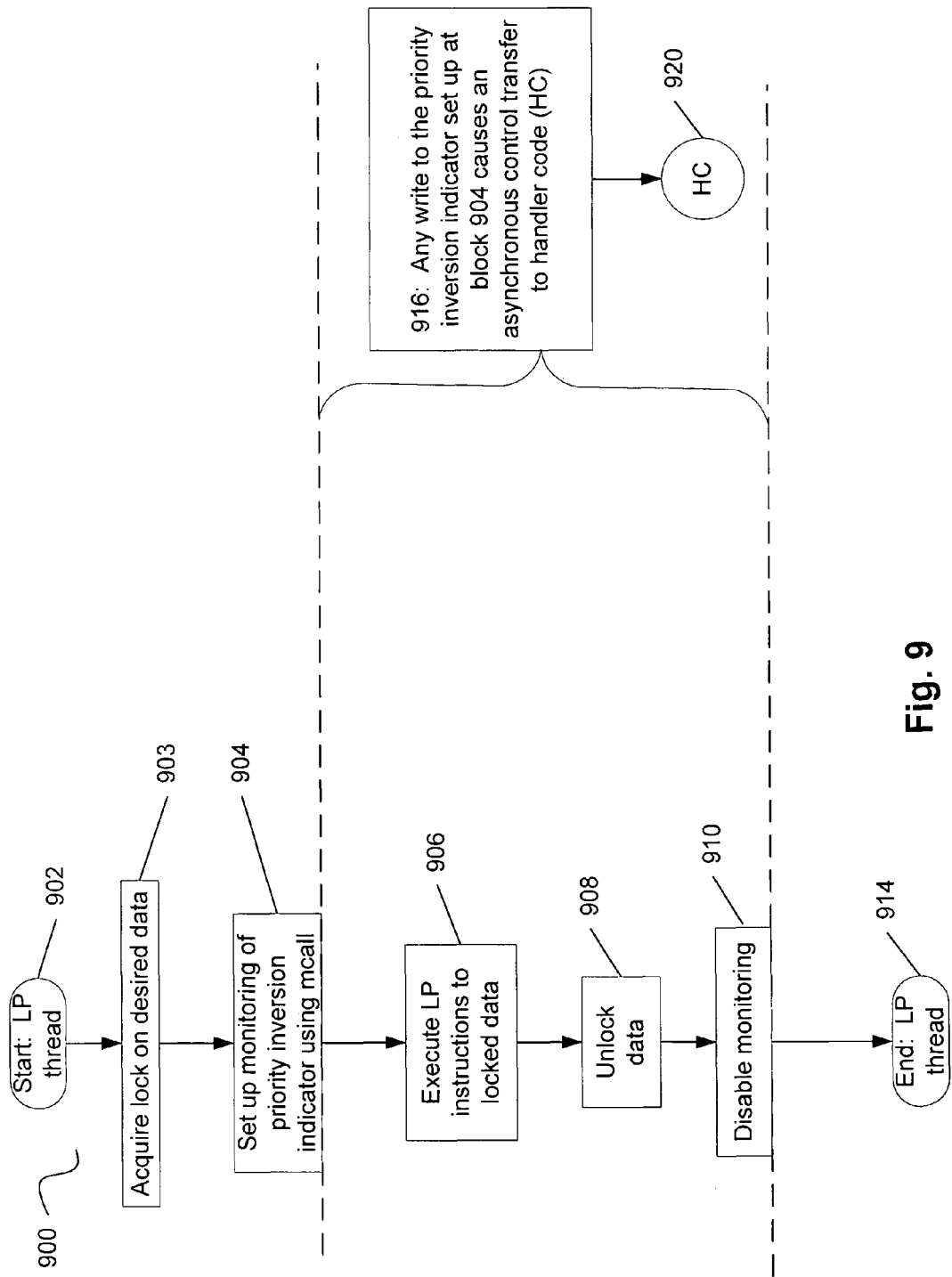
FIG. 9 is a flowchart illustrating at least one embodiment of a method for utilizing user-level asynchronous signaling to correct priority inversion among concurrent threads.

FIG. 9 is a flowchart illustrating at least one embodiment of a method 900 for utilizing mcall (which employs user-level asynchronous hardware signaling) to alleviate priority inversion. Generally, the lower-priority thread sets up a location to which higher priority threads can write if they need access to data that the lower-priority thread ("LP") has locked.

FIG. 9 illustrates that the method 900 begins at block 902 and proceeds to block 903. At block 903, the LP thread acquires a lock on the desired data. Processing then proceeds to block 904.

At block 904, the LP thread sets up monitoring for a priority version indicator that higher-priority threads may write to in order to cause LP to abort and release its lock. Processing then proceeds to block 906.

At block 906, the LP thread performs its processing of the locked data. When such processing has been completed at block 906, processing then proceeds to block 908. At block 908, the LP thread releases its lock on the data. Processing then proceeds to block 910.

At block 910, the LP thread disables monitoring of the priority inversion indicator. Processing then ends at block 914.

Figure 10:
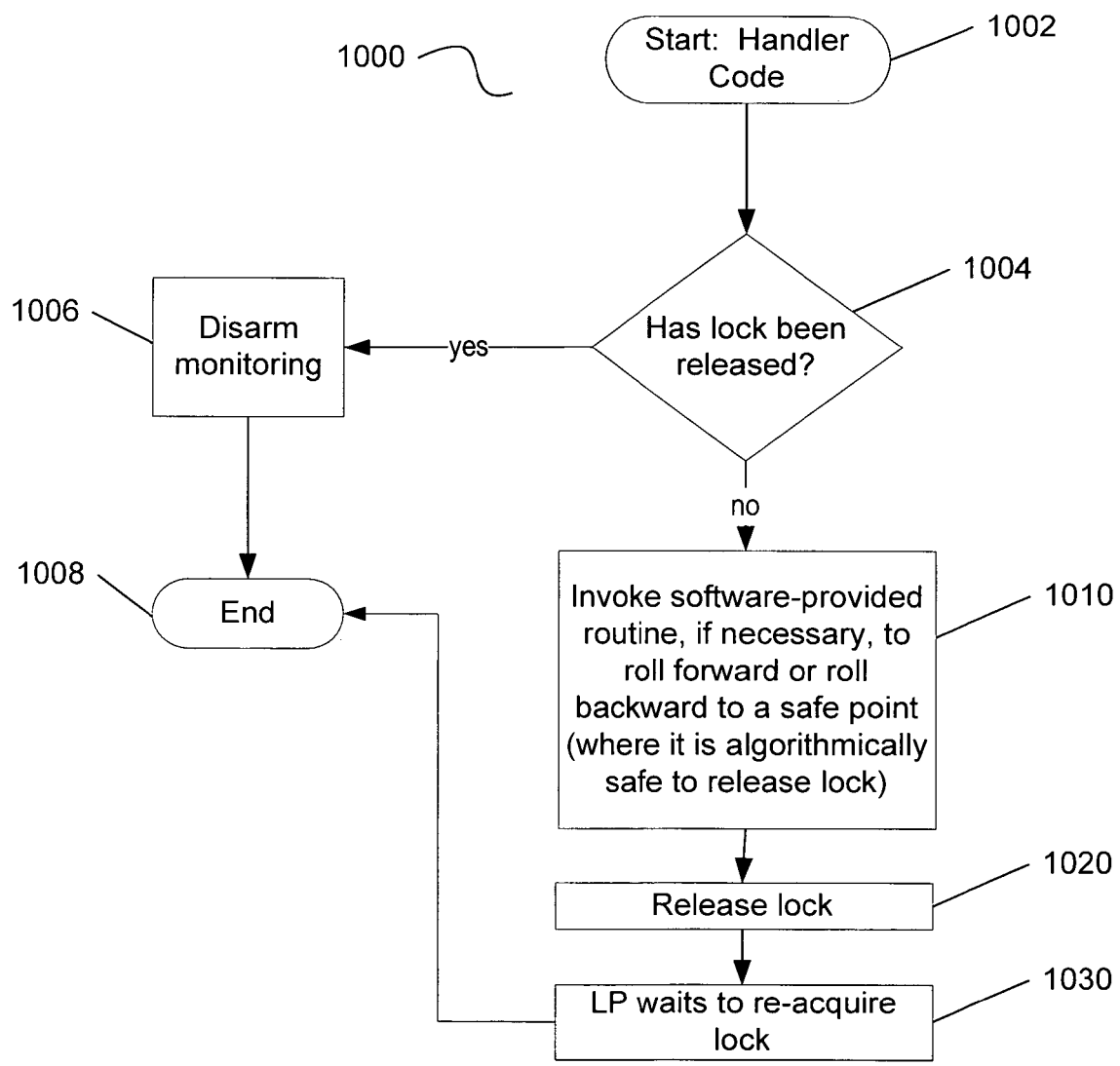
FIG. 10 is a flowchart illustrating at least one embodiment of a method for handling an asynchronous control transfer during execution of a lower-priority thread.

Handler code for mcall and Priority Inversion. FIG. 10 is a flowchart that illustrates at least one embodiment of a method 1000 for performing handler code 920 (FIG. 9) if an asynchronous control transfer occurs at block 916 of FIG. 9. This handler code may be invoked, for at least one embodiment, when a higher-priority thread detects that a lock (or other resource) that it requires is held by a lower-priority thread and then performs a write to a signaling variable that the lower priority thread is monitoring. The approach to determine if a thread is higher-priority may be done in a number of ways, which may include maintaining a central table of priorities based on the set of resources a thread has acquired.

FIG. 10 illustrates that the method 1000 begins at block 1002 and proceeds to block 1004. Regarding block 1004, it should be noted that the asynchronous control transfer 916 (FIG. 9) is performed only if another thread has written to the monitored priority inversion indicator, which in some cases may have occurred during the relatively small window between the time that the lower-priority thread has released the lock at block 908 but before monitoring has been disabled at block 910. Accordingly, FIG. 10 illustrates that at least one embodiment of the method 1000 for the handler code 920 determines at block 1004 if the unlock operation 908 was successfully completed before the write to the priority inversion indicator caused the asynchronous control transfer (see 916, FIG. 9) that caused the handler code 1000 to be invoked.

If it is determined at block 1004 that the lock has been released, then the lower-priority thread is not aborted. Processing of the handler code proceeds to block 1006, where the monitoring is disabled. Processing of the handler code then ends at bock 1008, and the lower-priority thread will return to the point it was prior to the invocation of the handler 1000. The higher priority thread will independently observe the release of the lock it is waiting on.

If, however, it is determined at block 1004 that the lock has not been released, then the lower-priority thread should be forced to release the lock so that the higher-priority thread that caused the asynchronous control transfer 916 of FIG. 9

(by writing to the priority inversion indicator) may attempt to acquire the lock. In such case, processing proceeds from block 1004 to block 1010.

Regarding block 1010, the lower-priority thread must be in a state where it is functionally correct to release the lock before it actually does so. In some cases this may be trivial—such as those cases in which it will always be safe for the lower-priority thread to release a lock at any time. In other cases, the lower-priority thread may need to reach a safe point where it is functionally correct to release the lock. In this case the software (either from the programmer, the compiler/JIT or the run-time) provides a routine by which the lower-priority thread can reach a safe point. Reaching a safe point can be achieved by either advancing the lower-priority thread to a safe point, called rolling forward, or rolling a thread backward through some form of undo routine. The software provided to reach a safe point should be able to do so without acquiring any additional locks. Once the lower-priority thread is in a safe state, processing proceeds from block 1010 to block 1020.

At block 1020, the lower-priority thread releases the lock. The higher priority thread will independently observe the release of the lock it is waiting on. The lower-priority thread then proceeds from block 1020 to block 1030. At block 1030 the lower priority thread waits until the lock is again free, which will occur after the higher-priority thread no longer needs the lock and releases it. The lower-priority thread waits in block 1030 until it acquires the lock, and then it proceeds to block 1008. At block 1008 the lower priority thread is done with the handler and will return to the point it was prior to the invocation of the handler 1000.

Discussed above are embodiments for three usage models of an mcall instruction that utilizes user-level asynchronous signaling to transfer control from a main thread to user-level handler code. For at least some of the embodiments disclosed herein, the main thread code and the handler code are both user-level code in that 1) they may be written by an application programmer and may reside in user space (as opposed to, e.g., operating system code) and 2) the handler code may be performed without a privilege level transition. That is, the handler code may performed at ring 3 user priority level. For at least one embodiment, this means that the handler code is invoked by hardware without the intervention of an operating system, which operates at a higher privilege level.

In sum, the three usage models of an mcall instruction discussed herein include an embodiment that utilizes mcall to implement a k-compare single-swap (operation). As is discussed above, such embodiment enhances efficiency of concurrent threading by providing non-blocking access to data structures by concurrent threads. The second usage model discussed above includes an embodiment that utilizes the mcall instruction to implement an asynchronous abort of a transaction that may be more efficient in that it may immediately abort a thread due to a data conflict rather than waiting until commit time to determine whether the data conflict has occurred. Finally, the third usage model includes an embodiment that utilizes the mcall instruction to detect and correct priority inversion among concurrently-executing threads.

Figure 5:
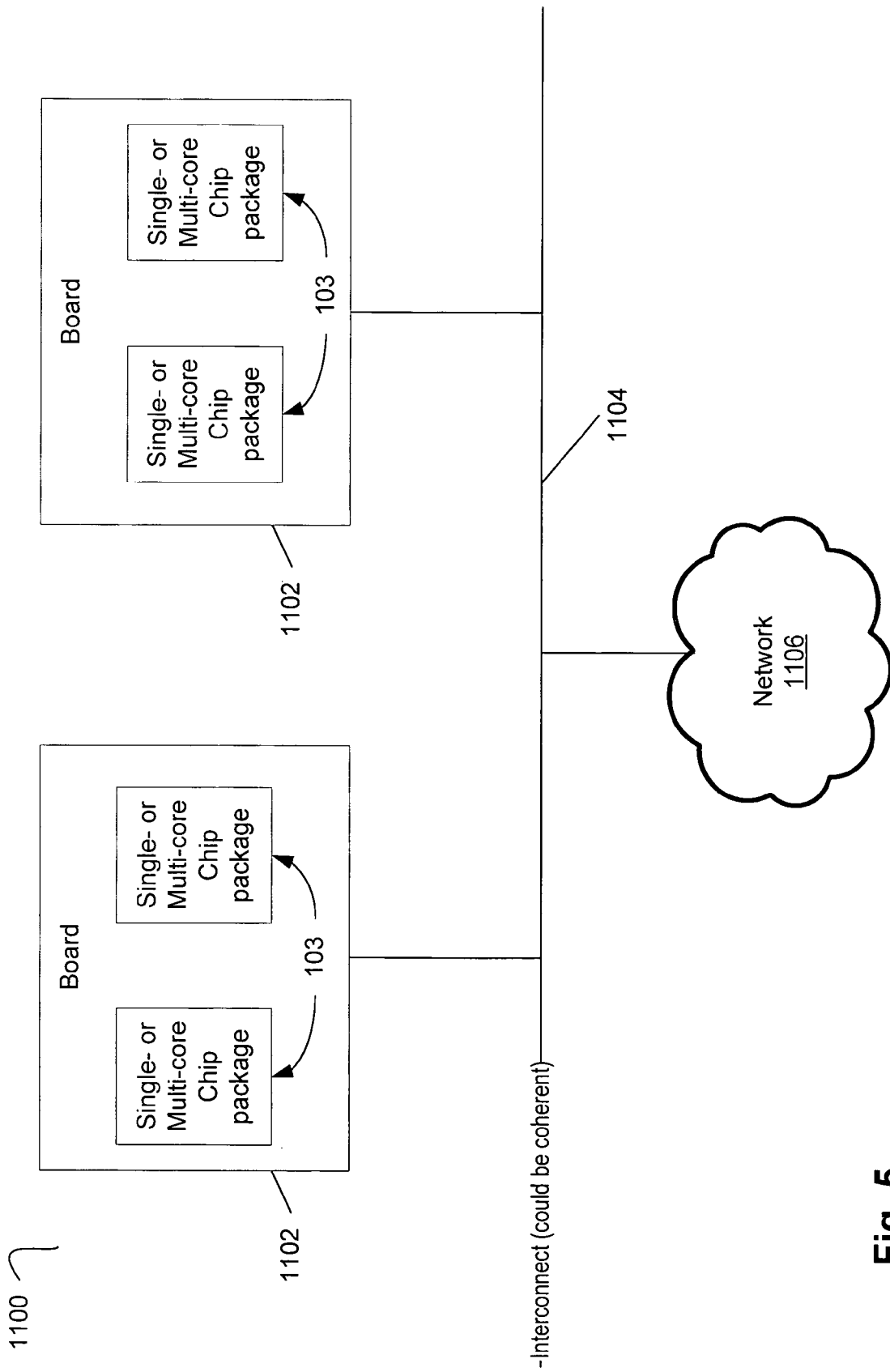
FIG. 5 is a block diagram illustrating at least one embodiment of a processor system capable of performing disclosed techniques.

Each of the usage models discussed herein may be performed on a multithreading system. FIG. 5 illustrates at least one embodiment of a system 1100 in which the usage models may be utilized. FIG. 5 indicates that the system 1100 may include one or more chip packages 103. As is illustrated in FIG. 2, each of the chip packages 103 may include one or more thread units 104a-104n (FIG. 2). FIG. 2 also illustrates that each of the boards 1102 may also include a memory 150 coupled to the chip package 103.

FIG. 5 illustrates that two or more chip packages 103 may be coupled together on a single board 1102. The system 1100 may optionally include additional boards 1102, where the multiple boards are coupled together by an interconnect 1104, which may or may not be coherent. The interconnect may be multi-drop bus, point-to-point interconnect, or any other type of communication pathway between the boards 1102. The boards 1102 may also be optionally connected to other devices via a network 1106.

The thread units 104, as is discussed above in connection with FIG. 2, may each include hardware to support asynchronous user-level signaling. Returning to FIG. 2, once can see that such hardware may include channel registers 1106 to hold a description of a triggering event ("scenario") and a handler code address. That is, the triggering event that triggers the handler code for each of the usage models described above (see, e.g., FIGS. 3, 7 and 9, respectively) may be referred to as a "scenario."

The triggering scenario may be an architecturally-defined set of one or more events. Alternatively, the triggering scenario may be a user-defined set of one or more events. Upon detection of the triggering scenario specified in the channel, control may be transferred to the user-level handler routine as described above.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Accordingly, alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other tangible arrangements of particles manufactured or formed by a machine or device. Instructions may also be used in a distributed environment, and may be stored locally and/or remotely for access by single or multi-processor machines.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) accessible by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 11:
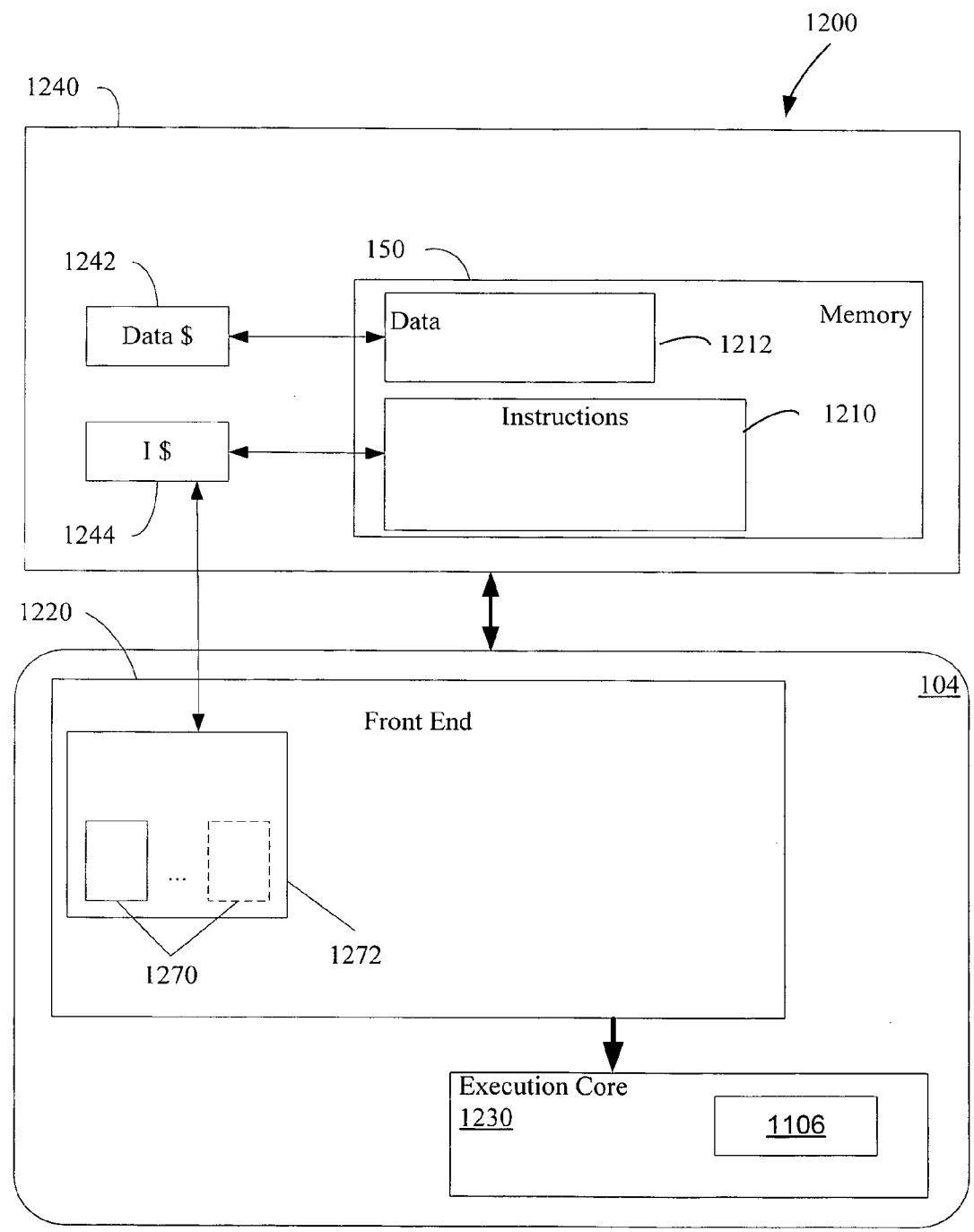
FIG. 11 is a block diagram illustrating additional features of a processor system capable of performing disclosed techniques.

An example of one such type of processing system is shown in FIG. 11. System 1200 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes and the like) may also be used. In one embodiment, sample system 900 may be executing a version of the WINDOWS® operating system available from Microsoft Corporation, although other operating systems and graphical user interfaces, for example, may also be used.

FIG. 11 illustrates that a processing system 1200 capable of performing disclosed techniques may include a memory system 1240 and a processor 104. Memory system 1240 may include a memory 150 as well as one or more on- or off-chip caches. For example, memory system 1240 may include a data cache 1242 and/or an instruction cache 1244.

Memory system 1240 may store instructions 1210 and/or data 1212 for controlling the operation of the processor 104. The instructions 1210 and/or data 1212 may include code for performing any or all of the techniques discussed herein. That is, the instructions 1210 may include instructions to perform each of the methods 300, 600, 700, 800, 900, 1000 discussed above. Also, the data 1212 may include shared data such as the k locations discussed in conjunction with FIGS. 3 and 6, the descriptor discussed in conjunction with FIGS. 7 and 8, and the inversion indicator discussed in conjunction with FIGS. 9 and 10, above. Memory system 1240 is intended as a generalized representation of memory and may include a variety of forms of memory, such as a hard drive, CD-ROM, random access memory (RAM), dynamic random access memory (DRAM), static random access memory (SRAM), etc, as well as related circuitry.

FIG. 11 illustrates that the processor 104 may include a front end 1220. The front end 1220 may include fetch and decode logic. For instance, the front end 1220 may include logically independent next-instruction-pointer and fetch logic 1270 to fetch instructions for each thread context, even though the multiple logical hardware threads of control may be implemented in a single physical fetch/decode unit 1272. Alternatively each processor 104 may be a single-threaded processor that includes only one set of next-instruction-pointer and fetch logic 1270 in the fetch/decode unit 1272.

The fetch/decode unit 1272 may include decoder logic to decode instructions, such as the mcall instruction and the lock-cmpxchg instruction (described above as the basis for the CAS operation). Responsive to receiving one of the instructions, the decode logic 1272 may send one or more signals to an execution core 1230 that causes the execution core 1230 to perform the desired operation. FIG. 11 illustrates that the execution core 1230 includes hardware to support asynchronous user-level signaling, such as channel registers 1106.

While particular embodiments of the present invention have been shown and described, it will be obvious to those skilled in the art that changes and modifications can be made without departing from the scope of the appended claims. Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A system for detecting a conflict, comprising:
a first thread unit and a second thread unit, the first and second thread unit to execute two concurrent threads of a software application;
a memory coupled to the first and second thread units;
said memory to store software instructions to implement an atomic multiple-compare and single-swap ("kcss") operation, wherein the kcss operation includes a call to an mcall instruction and is to monitor access to k addresses organized as an array, wherein the kcss operation is to detect, by the first thread unit, a conflict between the two concurrent threads based on detecting a write by the second thread unit to one of the k addresses in the array and is to utilize a hardware mechanism of the first thread unit to trigger a user code handler responsive to said conflict;
the hardware mechanism of the first thread unit to perform an asynchronous control transfer to the user code handler responsive to the write, by the second thread unit, to the one of the k addresses in the array;
wherein said user code handler includes one or more instructions to determine whether the conflict occurred before an atomic compare-and-swap of a kth address specified in the kcss operation.

2. The system of claim 1, wherein:
said memory is a DRAM.

3. The system of claim 1, wherein:
said software instructions include instructions for a software transactional memory transaction abort operation.

4. The system of claim 3, wherein:
said software instructions are further to detect a write operation, by the second thread unit, to an input data address for an atomic software transaction being executed by the first thread unit.

5. The system of claim 1, wherein:
said software instructions include instructions for a priority inversion correction operation.

6. The system of claim 5, wherein:
said software instructions are further to detect a write operation, by the second thread unit, to an inversion indicator monitored by the first thread unit.

7. The system of claim 6, wherein:
said software instructions are further to stall execution of the first thread unit and release a software lock held by the first thread unit.

8. A method, comprising:
enabling monitoring of one or more memory locations responsive to execution of an atomic multiple-compare and single-swap ("kcss") operation by a first thread unit, the one or more memory locations corresponding to a software transaction descriptor record for a transaction; wherein the kcss operation includes a call to an mcall instruction and is to monitor access to the one or more memory locations organized as an array;
beginning to execute a set of one or more instructions associated with the transaction on a first thread unit;
responsive to a write operation to the at least one of the one or more memory locations by a second thread unit, disrupting the execution of the set of instructions on the first thread unit, due to the execution of the kcss instruction, and transferring control to user-level handler code to be executed by the first thread unit;

wherein said disrupting is performed by asynchronous user-level signaling hardware;

and wherein the user-level handler code is to abort the transaction and cause a false value to be returned for the transaction.

9. The method of claim 8, wherein:

said user-level handler code is to return a failure indication if said kcss operation was not successfully completed before said disruption.

10. The method of claim 8, wherein:

the set of one or more instructions is a first thread.

11. The method of claim 10, wherein:

said write operation is performed by a second thread, the second thread having higher priority than the first thread.

12. The method of claim 11, wherein:

said user-level handler code is further to release a lock held by the first thread.

13. The method of claim 8, wherein:

wherein said transferring is performed without a change in privilege level for the first thread unit.

14. An article comprising:

a non-transitory computer storage medium having a plurality of machine accessible instructions;

wherein, when the instructions are executed by a first thread unit, the instructions provide for:

enabling monitoring of one or more memory locations associated with an atomic multiple-compare and single-swap ("kcss") operation, wherein the kcss operation includes a call to an mcall instruction and is to monitor access to the one or more memory locations organized as an array;

beginning to perform a set of one or more instructions associated with the kcss operation on the first thread unit;

responsive to a write operation to at least one of the one or more the memory locations by a second thread unit, disrupting the execution of the set of instructions on the first thread unit, due to execution of the kcss instruction, and transferring control to user-level handler code to be executed by the first thread unit;

wherein said disrupting is performed by asynchronous user-level signaling hardware; and wherein said user-level handler code is to perform one or more actions associated with abort of the kcss operation.

15. The article of claim 14, wherein:

said user-level handler code is to return a failure indication responsive to a memory modification by the second thread unit to at least one of the one or more memory locations that breaks atomicity for the software transaction.

16. The article of claim 14, wherein:

said user-level handler code is to return a failure indication if said kcss operation was not successfully completed before said disruption.

17. The article of claim 14, wherein:

the set of one or more instructions is a first thread.

18. The article of claim 17, wherein:

said write operation is performed by a second thread, the second thread having higher priority than the first thread.

19. The article of claim 18, wherein:

said user-level handler code is further to release a lock held by the first thread.

20. The article of claim 14, wherein:

wherein said transferring is performed without a change in privilege level for the first thread unit.

* * * * *